April 17, 1956 J. J. HALL 2,741,826
METHOD OF ASSEMBLING A BALL BEARING
Filed Dec. 27, 1952
*FIG. 2*     *FIG. 1*
     
*FIG. 4*     *FIG. 3*
     
*FIG. 5*     *FIG. 6*
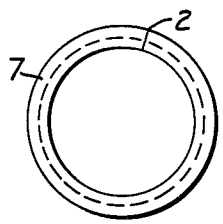     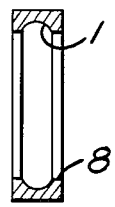
*FIG. 8*
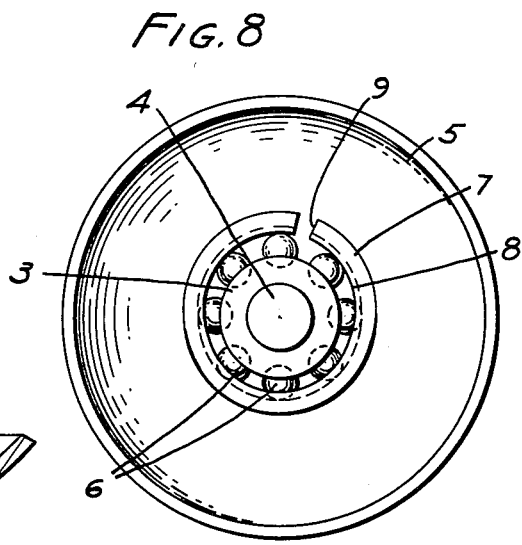
*FIG. 7*
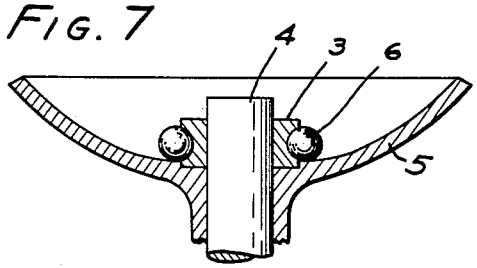
INVENTOR.
JOHN J. HALL
BY
*D. Gordon Argus*
ATTORNEY.

United States Patent Office 2,741,826
Patented Apr. 17, 1956

2,741,826
METHOD OF ASSEMBLING A BALL BEARING

John J. Hall, Arcadia, Calif., assignor to Wheel Craft Corporation, Azusa, Calif., a corporation of California Application December 27, 1952, Serial No. 328,235

1 Claim. (Cl. 29—148.4)

My invention relates to improvements in a method of making and assembling an outer ball race into a ball-bearing arrangement in which an outer ball race with abutting ends is stretched into ball race position around the ball-bearings; and the objects of my improvements are to provide an outer ball race that springs into position around the balls of a ball-bearing arrangement; and to provide a quick and easy means of assembling the outer ball race as part of the ball-bearing arrangement.

The construction and arrangement of my method of making and assembling outer ball race into a ball-bearing arrangement will be better understood from the following description and the accompanying drawings.

Fig. 1 is a side view of a piece of rectangular bar stock.

Fig. 2 is an end view of Fig. 1.

Fig. 3 is a groove impressed into Fig. 1.

Fig. 4 is an end view of Fig. 3.

Fig. 5 is a side view of Fig. 3 formed into a circle with ends abut.

Fig. 6 is a cross section of Fig. 5.

Fig. 7 and 8 are side elevation view in section and a top view, respectively, of a device for assembling the ball-bearing, the only purpose of these figures being to show how the outer ball race is stretched over ball-bearings.

Similar numerals refer to similar parts throughout the several views.

The first operation is to select a piece of rectangular bar stock (Fig. 1) and impress a groove 1 into one surface (Figs. 3 and 4); and then the bar stock (Fig. 3) is cut into lengths correct for the size of the ball race so that when each cut strip is formed into a circle as shown in Figs. 5 and 6, the ends will abut (2) into an outer ball race 7; then to assemble the outer ball race 7 into a part of a ball-bearing arrangement, the inner ball race 3 (no part of the present invention) is placed over a vertical stud 4 in the bottom of a concave dish 5, Figs. 7 and 8; and then the balls 6, 6 etc. are poured into the dish 5 so that they take their position around the inner ball race 3, Figs. 7 and 8; then the outer ball race 7 is pushed down over the balls 6, 6 etc.; and since the inner circumference 8 of the outer ball race 7 is somewhat smaller than the circumference of the groove 1, the abutting ends 2 of the outer ball race 7 will spread apart and form a space 9 while the circumference is being pushed past the balls 6, 6 etc.; then when the groove 1 is in position around the balls 6, 6 etc., the outer ball race 7 will spring back to eliminate the space 9, forming adjoining butts 2 as shown in Fig. 5. In Fig. 5 the outer ball race 7 is in its original shape and in Fig. 8 the outer ball race 7 is shown distorted, and when the distortion is released by the circumference 8 passing past and around the balls 6, 6 etc. the outer ball race 7 recovers its original shape (Fig. 5). An outer ball race 7 as described is quickly and easily assembled as part of a ball-bearing arrangement.

The ball bearing, which comprises the inner ball race 3, the balls 6 and the outer ball race 7 is held together by virtue of the springiness of the outer ball race. After the outer ball race is snapped over the balls, the integral ball bearing is removed from the dish where it was assembled. The ball bearing is now ready for use.

It will be recognized that by my invention there is provided a relatively simple and inexpensive ball race arrangement. Furthermore, the assembly can readily be assembled and disassembled simply by snapping on and off the outer ball race over the balls. This readily permits replacement of parts. Furthermore, it allows for converting the assembly to different sizes. For example, where a ball bearing assembly of a relatively large diameter is wanted, the outer ball race can be made of relatively thick bar stock; and conversely where the diameter is to be relatively small, the ball race can be made of relatively thin bar stock.

Ordinarily the outer ball race will be of steel with enough springiness or resilience to provide for the stretching apart of the end and the restoration to the abutting position. It should be understood however, that the arrangement is not limited to steel as the material, as other materials with the desired physical properties might be used instead.

While I have in the above description of my invention disclosed what I now believe to be a preferred and practical embodiment of the same, it will be understood by those skilled in the art that the specific details of construction and arrangements of parts, as shown and described, are by way of example and not to be construed as limiting the scope of the invention.

I claim:

The method of assembling a ball bearing of the type having an inner ball race and an outer ball race which comprises placing the inner ball race at the bottom of a concave dish, putting the balls in the dish so that they roll toward the center and assume positions around and in contact with said inner ball race, then stretching over the balls a circular strip of springy material having abutting ends and provided with an internal groove so that the abutting ends of the strip separate while the strip is pushed over the balls and then restore themselves to abutting position when the balls are within the groove, and there removing assembled bearing from the disk.

References Cited in the file of this patent
UNITED STATES PATENTS

| | | |
|---|---|---|
| 1,153,066 | Gurney | Sept. 7, 1915 |
| 2,624,104 | Finstead | Jan. 6, 1953 |
| 2,625,449 | Sutowski | Jan. 13, 1953 |
| 2,648,578 | Stearns et al. | Aug. 11, 1953 |
| 2,657,105 | Stearns | Oct. 27, 1953 |
| 2,702,216 | Stearns | Feb. 15, 1955 |